United States Patent Office 3,438,247
Patented Apr. 15, 1969

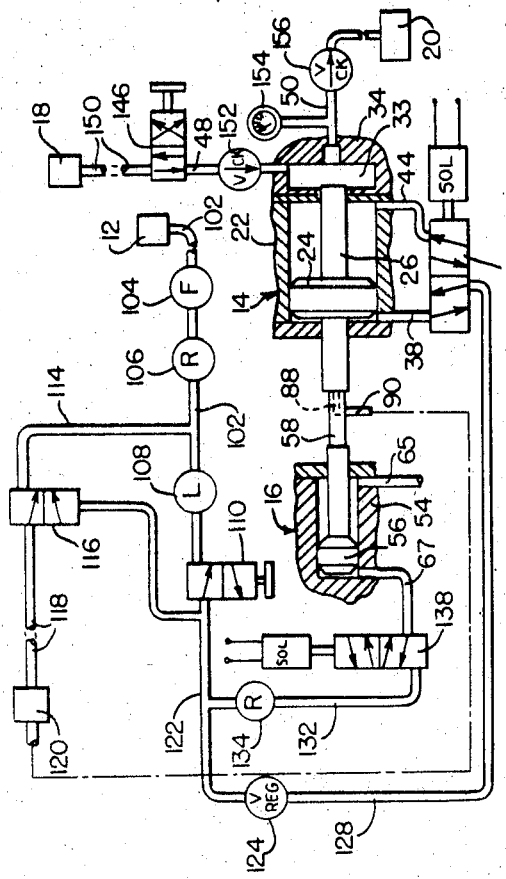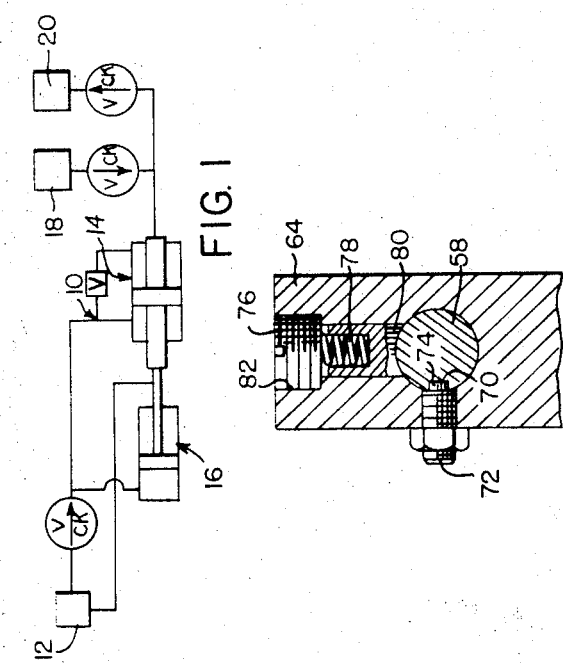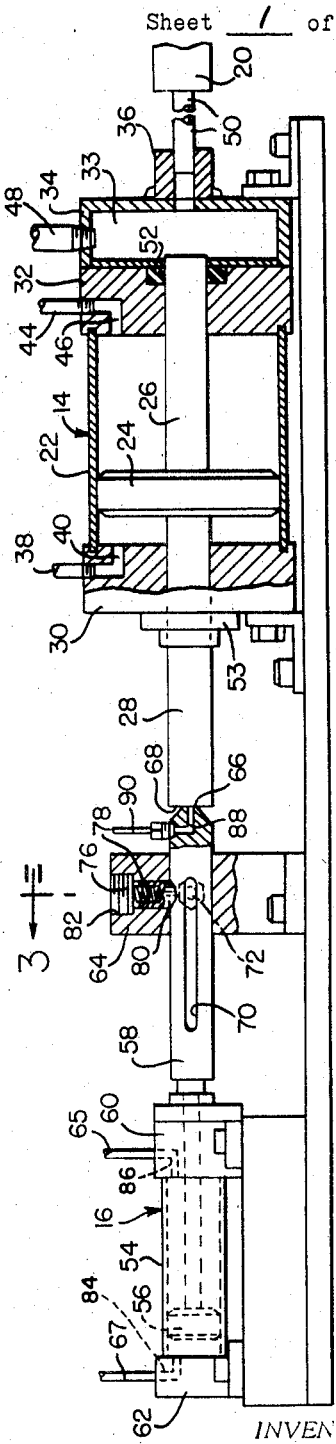

3,438,247
HYDRAULIC LEAK TESTING SYSTEM AND APPARATUS
Louis B. Lotti, St. Clair Shores, and Donald W. Bates, Warren, Mich., assignors to Stellar Engineering, Inc., Warren, Mich., a corporation of Michigan
Filed June 19, 1967, Ser. No. 646,880
Int. Cl. G01m 3/24
U.S. Cl. 73—40                         16 Claims

ABSTRACT OF THE DISCLOSURE

The hydraulic leak testing system and apparatus of this invention comprises a hydraulic force piston device, applying pressure to a hydraulic fluid-filled line or device to be tested for leakage, in combination with an associatedly operated contiguous contact-making device maintaining relative contact with the force applying device during an initial period of pressure application to the hydraulic line or device to be tested. The contiguous contacting device is then arranged to maintain the initial set position while the force applying device continues to apply further pressure to the hydraulic line or device to be tested. Upon displacement of fluid in such hydraulic line or device, separation of the force applying device from the contiguous contact device is arranged to occur, producing a gap between them, through which gap a discharge of fluid under pressure is permitted, actuating an associatedly audible and/or visible signal. The essence of the invention involves the establishment of a separation between the force applying device and the contiguous contacting device.

---

The invention apparatus, in one exemplary embodiment of the invention, comprises a force applying piston and force multiplier associatedly connected to a hydraulic fluid-filled line or device to be tested, in which line or device continuing pressure can be applied for the detection of hydraulic fluid leakage anywhere in such line or device. Associated with the force piston is a test piston and pin, the latter making contiguous contact with a projecting portion of the force piston. Fluid pressure is simultaneously applied to the main force piston and the test piston during the initial period of force application to the hydraulic-filled line or device to be tested. Further pressure is then discontinued to the test piston permitting it to assume a static position, while continuing pressure is applied to the main force piston operating upon the hydraulic-filled line or device to be tested. If a leak occurs in such line or device before separating, the main force piston will move forwardly, effecting a separation from the test piston and pin. The gap produced upon separation can be utilized in a number of ways for the signalling of such separation.

Examples of the application for the inventive system and apparatus appear to be many. Among them is the leakage testing of hydraulic brake systems in automobiles, trucks and similar operator-controlled vehicles, the safe operation of which is of major significance. In order to determine the leakage characteristics, if any, of such brake systems before vehicles are approved for shipment, the hydraulic fluid lines and brake devices are checked and tested. Such testing is normally accomplished at the manufacturing tempo of the vehicles, which may range from a few to many units per minute and hour. The system and apparatus of this invention provide a means for such testing. Another application for the invention is the hydraulic lines serving as power means for the operation of various hydraulic-drive systems and devices including servomechanisms, valves, pumps, hydraulic turbines, and many other hydraulic or hydraulic-driven devices.

It is an object of the invention to provide a system for hydraulic leakage detection in which leakage in a hydraulic fluid filled line or device to be tested is made apparent by means of apparatus associatedly connected to and operative upon the hydraulic line or device. Another object is to provide apparatus in such a system in order that, upon the occurrence of hydraulic fluid leakage in the line or device to be tested, a device applying pressure or force to the hydraulic line or device to be tested will operate in relationship to and separation from a contiguously contacting device maintained in static position. A further object is to provide a system and apparatus in which the occurrence of a gap between the force applying device and the test or checking device causes the actuation of an audible and/or visible signal.

These and other objects of the invention and features of construction, and advantages of the invention will become more clearly apparent from the following description taken in conjunction with the accompany drawings, in which:

FIGURE 1 is a diagrammatic outline of the system of the invention disclosed herein.

FIGURE 2 is an enlarged view of one form of apparatus which can be utilized in the system of this invention.

FIGURE 3 is an enlarged fragmentary view of a portion of the apparatus taken substantially on the line 3—3 of FIGURE 2.

FIGURE 4 is a diagrammatic outline of a hydraulic system and apparatus constituting one exemplary embodiment of the invention.

Figure 5:
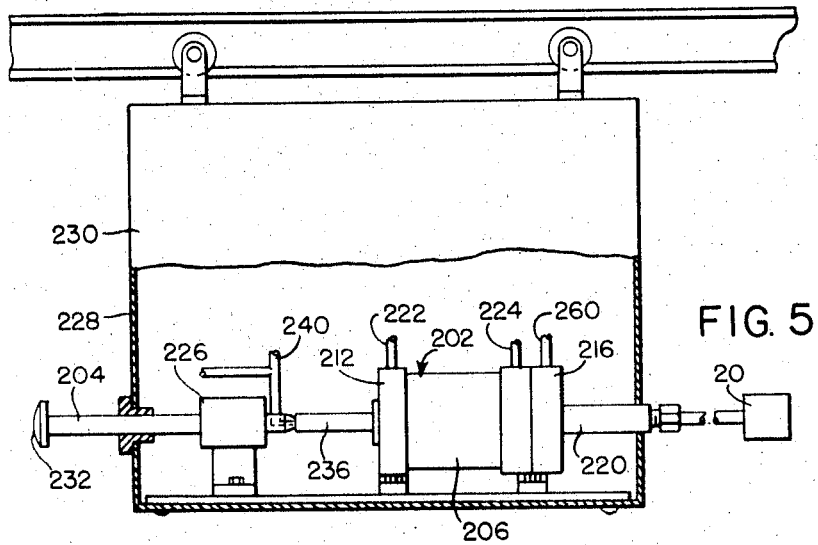
FIGURE 5 is a front elevational view of a semi-automatic form of hydraulic fluid leakage detection apparatus, shown partially in section.

Referring to the several views in the drawings, and with particular reference to FIGURE 1, a hydraulic leakage detection system 10 comprises a source of pressurized air or hydraulic fluid supply 12, a main booster cylinder and piston 14, a test cylinder, piston and pin 16, a hydraulic fluid supply source 18, and a hydraulic fluid operated device or system to be checked 20. These devices are associatedly connected for hydraulic fluid leakage detection according to the system diagrammatically illustrated in FIGURE 1.

The main booster cylinder and piston 14 comprises a cylinder 22, a piston 24, a force multiplier piston 26, a rearwardly directed piston pin 28 conjoined to the piston 24, a rear end block 30, a forward end block 32, a hydraulic fluid chamber 33 in a housing 34, and a hydraulic fluid discharge conduit 36. The booster piston 24 is operatively moved, by the air or hydraulic fluid supply from source 12 through air input conduit 38 and passage 40 in the rear end block 30, in a direction such that multiplier piston 26 moves forwardly into the hydraulic fluid chamber 33. The booster piston 24 is moved in a reverse or rearwardly direction by the air or hydraulic fluid supply when the same is introduced through conduit 44 and passage 46 in forward end block 32. The hydraulic fluid chamber housing 34, shown secured to the forward end block 32, is served by conduit 48 with hydraulic fluid supplied by the source 18, the fluid being charged into chamber 33 for discharge through the conduit 36 and connected conduit 50 communicating with the device or system 20 to be checked. A fluid seal 52 is secured about the multiplier piston 26 at the housing 34 to prevent loss of pressure in the chamber 33. The rearwardly directed piston pin 28, secured to the booster piston 24, extends through the rear end block 30 and seal 53 secured to the end block. The pin 28 extends outwardly a distance at least equal to or greater than the permissible longitudinal axial travel of booster piston 24 in its cylinder 22, or the permissible longitudinal axial travel of the multiplier piston 26 in chamber 33.

The test cylinder, piston and pin 16 comprise the test cylinder 54, test piston 56, the test piston pin 58, forward and rear test cylinder end blocks 60 and 62, respectively, and a test pin support block 64. Air or hydraulic fluid is supplied by the source 12 to the test cylinder 54 through conduit 65. The test piston 56 and test pin 58 are preferably arranged in axial alignment with the booster rear pin 28 so that the forward end face 66 of the test pin 58 makes contiguous contact with the rear end face 68 of the booster rear piston pin 28.

The test pin 58 is provided with a longitudinally extending slot 70, and the test pin support block 64 is arranged with a lateral screw 72 having its forward end 74 disposed within the slot 70 for limiting longitudinal travel of the test pin 58 to the length of the slot. The support block 64 is also provided with a screw 76, spring 78 and friction saddle 80 in the counterbored opening 82 above the test pin 58, to provide frictional engagement of the saddle 80 with the test pin 58. The test cylinder 54 is served from the air or hydraulic fluid supply 12 by a conduit 84 in rear end block 62 and a conduit 86 in forward end block 60.

The digital end of the test piston pin 58 adjacent the face 66 is provided with an air passage 88 served by a conduit 90 communicating with a source of compressed air, such as the source 12, the air passage 88 terminating at the test pin end face 66 adjacent and making direct bearing contact with and upon the end face 68 of booster piston rear pin 28.

Air or fluid conduit 90, communicating with test pin passage 88 at the digital end of test pin 58, is connected to a pressure responsive control device 120 including a visual and/or audible signal operated upon a reduction in pressure of air or fluid in conduit 90, when a gap occurs between the digital end 66 of the test pin 58 and the end face 68 of the booster piston rear pin 28, and the air or fluid escape from passage 88. This will occur when the booster piston 24 and multiplier piston 26 move forwardly upon discharge of hydraulic fluid at a leak point in the line or device 20 to be tested.

An exemplary hydraulic fluid leakage detector embodying the inventive system and the inventive apparatus is one illustrated in FIGURE 4. Such a system has been designed to serve, for example, in the testing of automotive brake systems, lines and brake devices. As shown particularly in FIGURE 4, the air or hydraulic fluid supply 12 is connected by conduit 102 to a filter 104, a pressure regulator 106, an air lubricator 108 if air is used, and a manually operated lock-out valve 110. The lock-out valve is a one-quarter turn valve for easy manual operation. The conduit 114 is T-connected to conduit 102 between the lubricator 108 and the regulator 106, and communicates with a control valve 116 connected by conduit 118 to the signalling device 120. The manual lock-out valve 110 is connected by conduit 122 to a regulator valve 124 disposed in conduit 128, which is connected to a solenoid operated valve 144 for operation of the main booster piston 24. Conduit 122 is further connected to and communicates with a conduit 132 having a pressure regulator 134 and leading to and communicating with the test piston control solenoid operated valve 138. Valve 138 is connected to the air or hydraulic fluid supply conduit 65 for test piston cylinder 54 to actuate movement of the test piston 56 and its pin 58.

Hydraulic fluid for the device or system 20 to be tested is introduced into the chamber 33 in housing 34 through conduit 48 connected to a manually operated, one-quarter turn valve 146. Hydraulic fluid supply 18 is connected by conduit 150 to the control valve 146. A check valve 152, operating in the direction leading to the chamber 33, is disposed in conduit 48, to prevent return flow to the control valve 146 under the pressures applied by the multiplier piston 26. A hydraulic fluid pressure gauge 154 is associatedly connected to the hydraulic fluid discharge conduit 50 leading through check valve 156 to the hydraulic fluid line or device 20 to be checked.

To operate the system illustrated in FIGURE 4, the hydraulic line or device 20 to be tested is first bled upon the application of hydraulic fluid from the supply 18. The bleed devices are then closed while pressure is maintained from the hydraulic fluid supply 18 to the line or device 20. Such initial pressure may be of any magnitude sufficient to maintain above atmospheric pressure in the conduit 48, chamber 33, conduit 50 and the line or device 20. Valve 146 remains open, and check valve 152 prevents fluid from backing into supply 18 when chamber 33 is put under high pressure. Fluid supply from the unit 12 through the filter 104, regulator 106, and lubricator 108 is charged under pressure through manual valve 110 into conduit 122, regulator valve 124 and conduits 128 and 132 to valves 138 and 144. The apparatus is now ready for automatic operation, and the operator will initiate such operation by actuating the start button in a control panel (not shown). Upon actuation of the start button, valves 138 and 144 will shift and put test piston 56 and the main booster piston 24 and multiplier piston 26 under pressure from fluid supply 12, in the direction of hydraulic chamber 33. The test pin end face 66 maintains contiguous bearing contact with the booster rear end face 68 so as to close the air passage 88 in test pin 58 against discharge of air or fluid therefrom. The forward movement of test piston 56 and the main booster piston 24 is coincident. Pressure regulator 134 allows the air or fluid from supply 12 to pass to test cylinder 54 only at a pressure just sufficient to maintain the test pin 58 in contiguous contact with the booster piston rear pin 28, as the two pistons 56 and 24 advance forwardly toward the hydraulic fluid in the chamber 33. Valve 138, communicating with conduit 67 leading to the test piston cylinder 54, is then shifted to exhaust conduit 67, the test pin 58 being at rest and maintained in a fixed position by the friction saddle 80 in support block 64. At the same time, fluid pressure in conduit 128 is maintained at the same magnitude through valve 144 and conduit 38, driving the main booster piston 24 and multiplier piston 26 forwardly under high pressure toward and into the hydraulic fluid chamber 33, and causing an extremely high pressure to be applied to the fluid in hydraulic line 50 and in the line or device 20 to be tested. The pressure that can be applied to the hydraulic fluid in chamber 33 and conduit 50 by the multiplier piston 26 are substantial and, under such circumstances, leakage of even a drop or two in the line or device 20 to be tested can be signalled. As an example, the dimensional characteristics of the booster cylinder and piston and the multiplier piston can be such as to apply up to 2,000 or more pounds per square inch of hydraulic pressure in the conduit 50 and in the system or device 20 to be tested. Under such pressure, a small leak of only a drop or two will initiate a forward shift of the booster rear pin sufficient to produce the signalling gap from which compressed air in the passage 88 will readily escape.

In the description of the apparatus illustrated in FIGURES 2, 3 and 4, the inventive system 10 was designed for automatic signalling of hydraulic fluid leakage in a line or device 20 to be tested. The test piston pin 58 was automatically maintained in contiguous contact with the booster piston rear pin 28 by air or hydraulic fluid applied simultaneously in the booster cylinder 22 and test cylinder 54. In the apparatus illustrated in FIGURES 5 and 6, the test pin is manually operated, only the main booster piston being air or hydraulically actuated.

Figure 6:
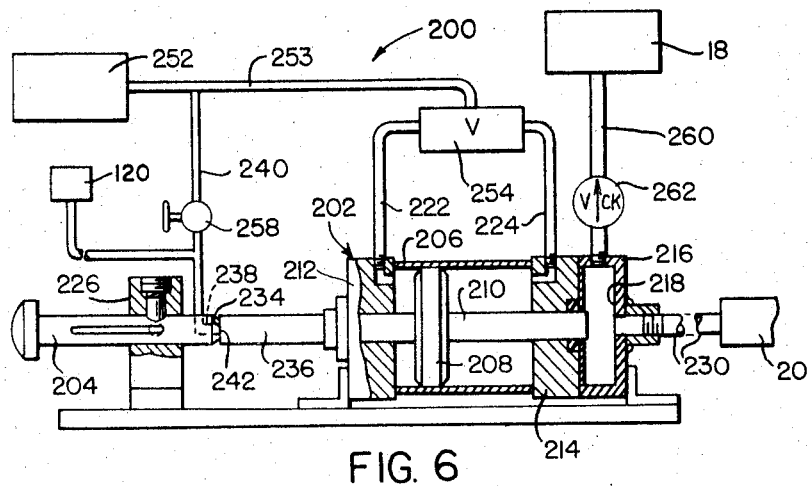
FIGURE 6 is a diagrammatic outline of a hydraulic fluid leakage detection system embodying the apparatus illustrated in FIGURE 5.

In the hydraulic fluid leakage detection system 200 (FIGURE 6), the main booster device 202 and the test pin 204 are associated together in the same manner as the main booster device 14 and the test device 16 described above and illustrated in FIGURES 2 and 4. As shown in FIGURES 5 and 6, the booster device 202 comprises a main booster cylinder 206, a booster piston 208, a booster multiplier piston 210, a rear end block 212, a forward end block 214, a hydraulic fluid chamber housing 216 containing the chamber 218, and a hydraulic fluid discharge conduit 220 communicating with the chamber 218 in housing 216. Conduits 222 and 224 communicate with the piston cylinder 206 at its rearward and forward ends respectively for driving the booster piston 208 and multiplier piston 210 forwardly and into the hydraulic fluid chamber 218.

The test pin 204 is movably mounted in a support member 226. As illustrated in FIGURE 5, the test pin 204 is of a length sufficient to project beyond the outer sidewall 228 of the mono-rail supported container 230. The test pin has at its outer end a head 232 adapted to be engaged by an operator's hand for moving the test pin into engagement and contact with the rear end face 234 of the booster piston rear pin 236. As illustrated in FIGURES 5 and 6, the digital end of the test pin 204 is provided with a passage 238 served by the communicating conduit 240, similar to the arrangement shown for the automatic apparatus illustrated in FIGURES 2 and 4. Conduit 240 is preferably arranged with some flexibility, which can be provided either by metal, plastic or other similar tubing for conducting air or hydraulic fluid into the test pin passage 238. The end face 242 at the digital end of the test pin 204 is finished smooth and square for full bearing contact with the rear end face 234 of the booster piston rear pin 236, so as to close the passage 238 when bearing contact is made between the facing surfaces.

The manual system 200 illustrated in FIGURE 6 comprises an air or hydraulic fluid supply unit 252, a conduit 253 leading from the supply unit to a control valve 254, the conduit 240 leading from the supply unit to the manually operated test pin 204 and having a manual control valve 258 therein, the main booster device 202, the hydraulic fluid supply unit 18 and conduit 260 leading therefrom to the hydraulic fluid chamber housing 216 and communicating with the chamber 218, conduit 260 having a check valve 262 therein, and the hydraulic fluid line, system or device 20 to be tested. The system 200, as illustrated and described, is a bare system to or in which many control devices of one type or another can be associated or installed, but it contains the essential elements of a manual hydraulic leakage detection system embodying the invention herein disclosed.

The air or hydraulic fluid supply unit 252 provides compressed air or hydraulic fluid, under pressure, to the control valve 254 serving the main booster cylinder 206 to drive the booster piston 208 and multiplier piston 210 forwardly toward and into the fluid chamber 218 or to retract the pistons and relieve pressure in the fluid chamber. The supply unit 252 also serves the conduit 240 communicating with the test pin passage 238. The hydraulic fluid supply unit 18, serves the chamber 218 by means of conduit 260, and, by conduit 220, the hydraulic line, system or device 20 to be tested. The check valve 262 in the conduit 260 prevents flowback of hydraulic fluid upon application of pressure to the fluid in chamber 218.

In operation, air or hydraulic fluid, under pressure, is applied to control valve 254 which is opened to pass such air or fluid through conduit 222 to the booster device cylinder 206 and to move the piston 208 forwardly toward the chamber 218. When the pressure exerted upon the hydraulic fluid in chamber 218, the conduit 260 up to the check valve 262, the conduit 220 and in the line or device 20 to be tested reaches a predetermined value, which may be indicated by a pressure gage in the line, the test pin 204 is then manually advanced in its support block until its end face 242 makes full bearing contact with the end face 234 of rear pin 236 to close off the passage 238 in the test pin. Valve 258 in conduit 240 is then manually opened admitting air or hydraulic fluid under pressure to the test pin passage 238. As pressure is maintained by the booster device 202 in the line or device 20 to be tested, any leakage in such line or device will result in a forward advance of the booster piston rear pin 236. Such advance may occur immediately or over a period of time, depending upon the leakage characteristics, if any, in the line or system 20 to be tested. After waiting a period of time, the period being entirely optional and conditioned upon many factors including but not limited to the number of points of leakage to be tested and checked, if a separation does not occur between the end faces 234 and 242, then the assumption can be made that apparently there is no leakage. If separation does occur between these faces, then the passage 238 is opened to atmosphere, and a discharge or air or hydraulic fluid therefrom will occur. Such discharge or exhaust can be used to actuate a visual and/or audible signal or alarm by means well known in the art to which the invention pertains. A visual inspection of the test pin end face and its relative position in respect to the booster rear pin end face provides means for observing the separation signalling leakage, and the audible escape of air can also be detected by listening adjacent the two faces. Another visual method is to observe whether hydraulic fluid escapes from between the two end faces, indicating a separation between them.

In the apparatus illustrated in FIGURES 2, 4, 5 and 6, the actuation of signalling equipment 120 or similar device indicating the presence of hydraulic fluid leakage has been primarily effected by means of a flow of air or fluid from the discharge passage at the digital end of the test pin 58 or 204, a consequent drop in pressure in the line leading to such passage and a device responsive to such drop in pressure connected to the signalling equipment. Such fluid flow takes place upon separation of the contacting end faces of the test pin and the end of the booster rear piston pin. A number of signalling devices responsive to such separation can be used. Those which have already been described include an electric signal light and an audible horn. These devices can also be actuated by means other than a flow of air or fluid through the separation gap. For instance, sensitive electrical proximity switches operating with magnetic-mechanical sensors can be attached to either the digital end of the test pin with respect to the rear end face of the booster rear piston pin, or attached to the booster rear piston pin for sensing its shift away from the end face of the digital end of the test pin. Another arrangement can include a differential pressure switch in the air or fluid line 90 or conduit 240, whereby on a decrease in pressure through escape of the air or fluid out of the test pin passage, the differential pressure switch would actuate an audible and/or visual signal. A device responsive to the audible escape of air through the test pin passage at the end face of the booster rear pin could be installed either upon the latter or upon the test pin for signalling such air escape.

Figure 7:
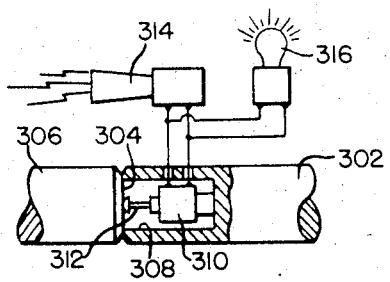
FIGURES 7 and 8 are fragmentary views of a portion of the apparatus disclosed herein, illustrating exemplary forms of signalling devices for hydraulic fluid leakage detection.
Figure 8:
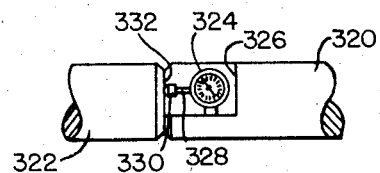

Another device indicating the separation of the test pin from the booster rear pin is that illustrated in FIGURE 7, wherein the booster rear pin 302 makes bearing contact with the end face 304 of the test pin 306, the rear pin 302 having a counterbored opening 308 in which is seated a microswitch 310, having its plunger pin 312 in contact with the rear end face 304 of the booster piston rear pin 306. The microswitch is electrically operated and is connected to a horn 314 and to a signal light 316 providing the audible and visual signals. Upon a forward shift (in the direction of the arrow) of the booster rear pin 302 because of leakage in the system or device 20 being tested, the microswitch 310 closes the circuit leading to and connected with the horn and signal light. Similarly in FIGURE 8, the associated booster piston rear pin 320 and test pin 322 are arranged with a dial indicator gauge 324 seated in a notched opening 326 of the booster rear pin 320. The plunger 328 has its head 330 in bearing contact with the end face 332 of the test pin 322, so that upon a shift away from the test pin 322 the dial indicator pointer registers such change upon the dial face. It will, of course, be understood that the signalling devices described above and illustrated in FIGURES 7 and 8 are applicable and can be used in the automatic apparatus illustrated in FIGURES 2 and 4 and in the manual apparatus illustrated in FIGURES 5 and 6. It is to be further understood that such signalling devices are merely representative of many which can be applied to the contacting booster piston rear pin and test pin to actuate or produce a signal responsive to the separation of the test pin and the booster piston rear pin upon which the inventive system is based.

The valves and controls described above in the systems of FIGURES 4 and 6 may be actuated by electrical solenoid devices, or may be operated by compressed air or by hydraulic fluids, or by other devices, which are generally well-known and available in industry to perform the necessary or desirable function of actuation in response to a pressure drop in the conduit leading to the valve or control, or to a change in current characteristic in the electrical lines leading to the solenoid devices, or to a shift in any manual valve or control. These devices are well known and in common use for the control of fluid lines and devices, and their utilization in the systems herein described is well within the skill of persons skilled in the art to which the invention pertains.

The hydraulic fluid supply unit 18 is normally composed of a supply tank of such fluid and an electrically operated pump to force the fluid under pressure through a conduit to the booster device chamber communicating with the line, system or device 20 to be tested. However, other means to furnish such fluid can also be employed. Similarly, the air or hydraulic fluid supply unit 12 or 252 serving the test pin and booster device is usually composed of a reservoir or supply tank and an electrically operated pump. Equivalent means may also be utilized.

It will, of course, be clearly understood that the apparatus and system of this invention is utilizable in connection with the leakage detection of all types of hydraulic fluid filled lines, devices and systems, and that the particular systems described above and illustrated in the drawing FIGURES 4 and 6 are only two applications or examples of systems in which the apparatus and system of this invention can be utilized.

Having described the invention in its simplest terms, it is to be clearly understood that features of the system and apparatus may be changed or varied in greater or lesser degree without departing from the essence of the invention defined in the appended claims.

We claim:

1. In a detection system for detecting hydraulic fluid leakage in a first hydraulic fluid means to be tested:
    second means for applying hydraulic fluid pressure in said first means substantially in excess of the operating pressure to which said first means is normally subject,
    third means in association with said second means for sensing the application of said excess fluid pressure in the presence of hydraulic fluid leakage at said first means,
    said second means including a pressure applying device having a movable element adapted to be contacted by said third means, said third means including a member adapted to be brought into contiguous contact with said movable element,
        said movable element under said excess fluid pressure adapted to advance upon the flow by leakage of hydraulic fluid from said first hydraulic fluid means to be tested and to separate from said member upon such advance, whereby a gap is produced between said member and said movable element.

2. The system defined in claim 1, wherein:
said movable element and said member are arranged in substantial alignment with each other.

3. The system defined in claim 1, wherein:
said second means comprises a housing and piston cylinder, a main booster piston, a multiplier piston and a rear end piston pin secured to said piston and extending outwardly of said housing,
and said movable element comprises said rear end piston pin adapted to be contacted by said member.

4. The system defined in claim 3, wherein:
said member comprises a test pin adapted to be moved into an initial contact position with said movable element simultaneously therewith,
and fourth means for holding said member in static position during a period of continuing application of excess fluid pressure in said first means to be tested.

5. The system defined in claim 4, wherein:
said test pin is provided with a passageway terminating at the digital end of said pin and making contact with said movable element,
    the contacting surfaces of said test pin and movable element providing a closure for said passageway at said digital end.

6. The system defined in claim 5, wherein:
the passageway of said test pin is served with pressurized fluid, whereby when separation between said contacting faces occurs said pressurized fluid escapes through said gap.

7. The system defined in claim 4, wherein:
said member comprises a test pin adapted to be moved manually into initial contiguous contact with said movable element.

8. The system defined in claim 1, wherein:
said second means and said third means are actuated for movement by pressurized fluid.

9. The syste mdefined in claim 1, wherein:
said first hydraulic fluid means to be tested comprises a hydraulic fluid line.

10. The system defined in claim 1, wherein:
said movable element is provided with a sensor secured adjacent its digital end and making contact with the digital end of said member when the two are in contiguous relationship,
said sensor being responsive to separation of said movable element from said member, and being adapted to actuate a signalling device.

11. The system defined in claim 10, wherein:
the sensed signal comprises an audible signal.

12. The system defined in claim 10, wherein:
the sensed signal comprises a visible signal.

13. The system defined in claim 10, wherein:
said sensor comprises a microswitch.

14. The system defined in claim 10, wherein:
said sensor comprises a dial indicator.

15. The system defined in claim 1, wherein:
said first hydraulic fluid means to be tested comprises a hydraulic fluid system.

16. The system defined in claim 1, wherein:
  said first hydraulic fluid means to be tested comprises a hydraulic fluid device.

References Cited

UNITED STATES PATENTS

| | | | |
|---|---|---|---|
| 909,950 | 1/1909 | Schreidt | 73—46 |
| 2,472,973 | 6/1949 | Hoffman et al. | 73—40 |
| 2,961,868 | 11/1960 | Hooper | 73—40 |
| 3,092,821 | 6/1963 | Muehlner | 73—40 XR |
| 3,246,507 | 4/1966 | Hyde | 73—37.5 XR |
| 3,353,402 | 11/1967 | Caligiuri | 73—37.9 XR |
| 3,360,982 | 1/1968 | Mitchell et al. | 73—40 |

LOUIS R. PRINCE, *Primary Examiner.*

J. NOLTON, *Assistant Examiner.*

U.S. Cl. X.R.

200—82